United States Patent

Hodel et al.

[11] Patent Number: 5,910,660
[45] Date of Patent: Jun. 8, 1999

[54] PROCESS AND DEVICE FOR DETERMINING THREE-DIMENSIONAL STRUCTURE IN THE SUBMICRON RANGE

[75] Inventors: Walter Hodel, Hunibach; Valerio Romano, Solothum; Heinz Paul Weber, Kehrsatz, all of Switzerland

[73] Assignee: Heinz Paul Weber, Kehrsatz, Switzerland

[21] Appl. No.: 08/913,485

[22] PCT Filed: Mar. 6, 1996

[86] PCT No.: PCT/CH96/00078

§ 371 Date: Sep. 17, 1997

§ 102(e) Date: Sep. 17, 1997

[87] PCT Pub. No.: WO96/29570

PCT Pub. Date: Sep. 26, 1996

[30] Foreign Application Priority Data

Mar. 17, 1996 [CH] Switzerland ............................. 765/95

[51] Int. Cl.⁶ .................................................. G01B 11/24
[52] U.S. Cl. ...................................... 250/559.22; 356/376
[58] Field of Search ........................ 250/559.22, 559.19, 250/201.8, 201.9; 356/376, 377

[56] References Cited

U.S. PATENT DOCUMENTS

| | | | |
|---|---|---|---|
| 4,732,485 | 3/1988 | Morita et al. ....................... | 250/559.22 |
| 5,194,918 | 3/1993 | Kino et al. . | |
| 5,559,603 | 9/1996 | Wakai et al. ........................ | 250/559.22 |
| 5,627,363 | 5/1997 | Paxman et al. ..................... | 250/559.22 |

FOREIGN PATENT DOCUMENTS

| | | |
|---|---|---|
| 2113848 | 12/1982 | United Kingdom . |
| 9002930 | 3/1990 | WIPO . |

OTHER PUBLICATIONS

"Fringe Multiplication Methods For Digital Interferometric Fringes", Applied Optics, Oct. 1989, vol. 28, No. 20, pp. 4323–4327.

"Digital Holography—A New Method Of Laser Metrology", Laser Und Optoelektronik, Oct. 1994, vol. 26, No. 5, pp. 40–45.

"Real–Time Two–Dimensional Surface Profile Measurement In A Sinusoidal Phase–Modulating Laser Diode Interferometer", Optical Engineering, Aug. 1994, vol. 33, No. 8, pp. 2754–2758.

Primary Examiner—Edward P. Westin
Assistant Examiner—Kevin Pyo

[57] ABSTRACT

A device and method for defining a three-dimensional structure of an object having a submicrometer size splits a coherent electromagnetic radiation beam into two partial beams including a first partial beam and a second partial beam. The first partial beam is focused on the object. The first partial beam is reflected from or dispersed from the object to yield a first radiation directed toward a locus. The second partial beam is directed toward the locus. The first radiation and the second radiation form an electromagnetic combination in a region of the locus. Second phase values are established from the initial phase values via multiplication of the initial phase values by one or more predetermined values to provide information for generating a magnified image representative of the object.

23 Claims, 2 Drawing Sheets

PROCESS AND DEVICE FOR DETERMINING THREE-DIMENSIONAL STRUCTURE IN THE SUBMICRON RANGE

BACKGROUND OF THE INVENTION

The invention relates to a device and a method for defining three-dimensional structures having submicrometer sizes. Structures in the submicrometer range are generally measured, for example, using scanning microscopes, wherein the object to be measured is moved through a servo device and the surface structure of the object being measured is scanned using a precision probe tip. The precision probes used in such methods are frequently damaged, resulting in undesirable interruptions in operation. In addition, the forces exerted by the precision probe on the surface of the object range from $0.1 \times 10^{-9}$ to $1.0 \times 10^{-9}$ newtons. Even these slight forces can result in a shift in positions on the object being measured.

Thus, there is a need for a method and a device that will not require a mechanical element to scan the surface of the object being measured.

SUMMARY OF THE INVENTION

In accordance with the invention, a device and method for defining a three-dimensional structure of an object having a submicrometer size splits a coherent electromagnetic radiation beam into two partial beams including a first partial beam and a second partial beam. The first partial beam is focused on the object. The wavelength of the radiation beam is preferably equal to a focal diameter of the object. The first partial beam is reflected from or dispersed from the object to yield a first radiation directed toward a locus. The second partial beam is directed toward the locus. The first radiation and the second radiation form an electromagnetic combination in a region of the locus. The positions of the partial beams are displaced relative to detectors associated with the locus to obtain radiation intensity values and initial phase values for a group of different coordinates of loci. Second phase values are established from the initial phase values via multiplication of the initial phase values by one or more predetermined values to provide information for generating a magnified image representative of the object.

The method and the device of the present invention produce improved resolution in comparison with optical microscopes limited by optical diffraction. In comparison to mechanical probing, the method and device of the invention reduces downtime in scanning operations by eliminating the need to replace mechanical probe tips, which are often particularly susceptible to damage.

An object is irradiated by two partial beams at different positions. The object is defined through an analysis of spatial and temporal complex amplitudes (intensity and phase angle distribution) proceeding from the object.

The concept of different beam positions for the two partial beams is understood to mean positions which generate different radiation fields created by superimposing the two partial beams at the locus of the detectors in the detector field. The phase angles of these various radiation fields differ at one and the same detector locus by different fractions of a complete wave oscillation. Thus, from preferably at least 3 measurements taken at one and the same locus, the amplitude and phase of the superimposed field can be positively determined. Since one of the partial beams comes from the object being measured, the measured, superimposed radiation field contains the information on the structure of the object.

As described in detail below, different beam positions can be generated, for example, within one beat cycle of a beat frequency state for the two partial beams which exhibit slightly different radiation frequencies. Of course, one partial beam may also be slowed down with regard to the other by a desired fraction of a wavelength, and its beam configuration may be modified. Such a deceleration of the partial beam can, for example, be effected using electro-optical, acoustic-optical, magneto-optical components, mechanical phase shifting elements, etc.

At least three measurements are preferably taken per locus for phase determination. It is possible, however, to proceed with fewer measurements if the measurements from adjacent detectors are compared with one another and used as ratios.

One practical application that uses the spatial intensity and the phase angle distribution is derived from techniques known-in-the-art of holography. With the measuring method specified in the invention for determining the structures of magnified objects, rather than viewing an interference structure generated by a reference beam, the complex amplitude is determined point by point. This complex amplitude is then used to calculate the associated phase-angle values from the measured values. The phase values are super-elevated using a multiplication factor that determines the magnification. From these elevated phase values and the real components of the measured, original complex amplitude, a second, complex amplitude is calculated, from which, using the spatial coordinates of the detectors, a magnified structure of the measured object (as, for example, a hologram) can be created which can then (following further calculations revisions) be displayed via a plotter or some other image-generating device.

Preferably, in determining the phase-angle values of the complex amplitude, using the radiation that is reflected back from the structure of the object being measured, superimposed beams exhibiting a low beat frequency are used. The beat frequency that is used is based upon, among other things, the speed of the recording cycle for the individual detector values read from the detectors of the detector field.

BRIEF DESCRIPTION OF THE DRAWINGS

Below, examples of the process specified in the invention, along with the device used to implement this process, are described in greater detail using the attached diagrams. Further advantages of the invention are discussed in the following descriptive text.

DETAILED DESCRIPTION OF THE PREFERRED EMBODIMENTS

Figure 1:
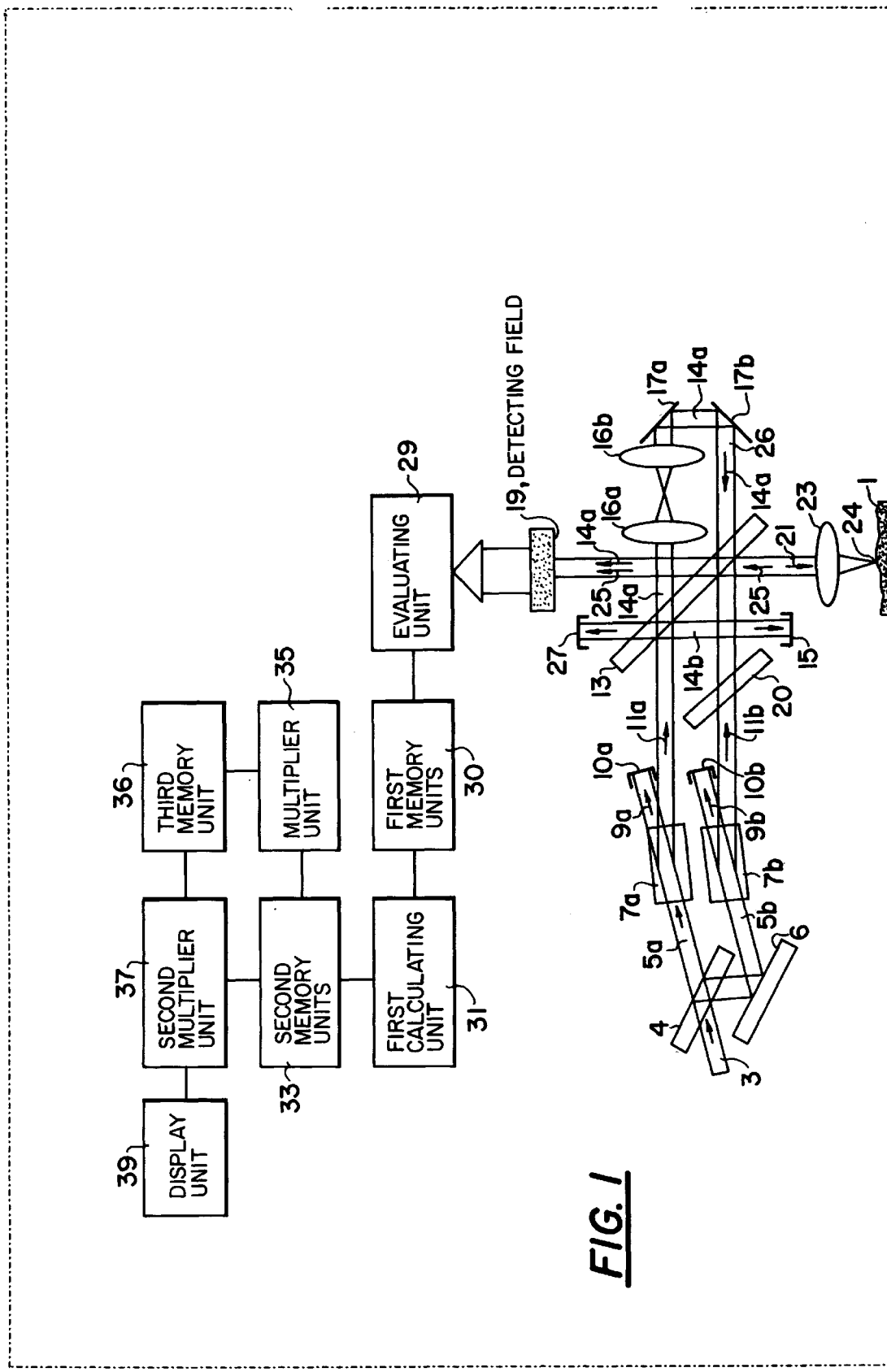
FIG. 1 is a block diagram of the device.
Figure 2:
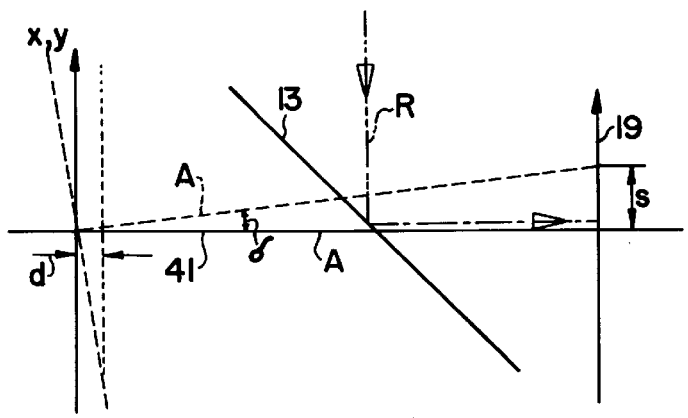
FIG. 2 is a system of coordinates used to calculate the superimposition of plane waves.

The device illustrated in FIG. 1 for defining three-dimensional structures in the submicrometer range of an object 1 uses coherent radiation, preferably coherent laser radiation. The coherent beam 3 is split into two partial beams 5a and 5b using a beam splitter 4. A deflecting reflector 6 is used to orient the partial beam 5b parallel to the partial beam 5a. Each of the partial beams 5a and 5b then passes through an element 7a and 7b that is designed to shift its radiation frequency. The frequency shift is effected via an acoustic-optical modulator 7a or 7b for each beam. The acoustic modulation frequencies of the two modulators 7a and 7b differ here, for example, by one hundred hertz. In other words, the radiation frequencies of the two beams $f_a$ and $f_b$ are shifted toward one another by one hundred hertz. The transmitted beam 9a or 9b in the acoustic-optical modulator 7a or 7b that is not deflected by the density wave of the modulation frequency is absorbed by an absorber 10a or 10b. Only the deflected beams 11a and 11b having the frequencies $f_a$ and $f_b$ are further processed. Preferably, however, radiation occurs below the Bragg angle, so that nearly all of the irradiated energy falls within the first deflected level.

The beam 11a now reaches a second beam splitter 13. A first beam section 14a of the beam 11a is transmitted by this beam splitter and the second, other part 14b is reflected and collected in an absorber 15. The partial beam 14a passes through two confocally oriented identical lenses 16a and 16b, and, following a displaced re-reflection via the two mirrors 17a and 17b, is sent back to the beam splitter 13, from which it is reflected onto the detector field 19 of a CCD [charge-coupled device] camera.

The beam 11b passes through a plane-parallel plate 20 that is inclined toward the axis of the beam and is oriented parallel to the beam splitter 13, and impinges upon the rear side of the beam splitter 13, striking it at the same location as the beam that has been reflected back by the two mirrors 17a and 17b. At this point, a first partial beam 21 from the beam 11b is reflected and is focused via a lens 23 onto the object 1 at the locus 24. The focusing diameter, depending upon the laser beam that is used, is slightly less than one micrometer. As described below, the beam 25 is now reflected back from the locus 24, is converted to a greater or lesser extent by the focusing lens 23 into a plane wave, is transmitted to the beam splitter 13, and becomes superimposed with the beam 14a on the detector field 19.

One partial beam from the beam 11b which is not further illustrated here is transmitted as a beam 26 to the beam splitter 13, is reversed by the two mirrors 17b and 17a, is transmitted to the two lenses 16b and 16a, is reflected back to the beam splitter, and is then absorbed by the absorber 27.

On the detector field 19, the partial beam 14a (5a–11a) having the beam frequency $f_a$, and the beam 25 (5b–11b-21), which has been reflected back from the locus 24 on the object 1, having the beam frequency $f_b$, which differs from the frequency $f_a$ by one hundred hertz (differential annular frequency $\Omega = 2\pi \cdot |f_a - f_b|$), now become superimposed.

In order to obtain a perfect superimposition, care must be taken to ensure that the optical pathway I of the partial beam 5a–11a-14a and the optical pathway II of the partial beam 5b–11b-21-25 lie within the coherence length of the beam 3. In order to prevent a dispersion of the group velocities on the two pathways I and II, the path lengths are selected, through materials other than air—for example the material of the beam splitters 4 and 13, and of the lenses 16a, 16b, and 23—such that they are equal in length.

Pathway I thus has one (glass) transmission thickness in the beam splitter 4 and three (glass) transmission thicknesses in the beam splitter 13, before reaching the detector field 19. Pathway II has two (glass) transmission thicknesses in the beam splitter 4, one (glass) transmission thickness in the plane-parallel plate 20, and one (glass) transmission thickness in the beam splitter 13, before reaching the detector field 19. Because of the identical optical design of the two beam splitters 4 and 13, along with the plate 20, the two pathways I and II have an equal number of (plane glass) "transmission thicknesses."

On Pathway I the beam is transmitted once to the two lenses 16a and 16b. On Pathway II the beam is transmitted twice to the lens 23. With the identical optical design of the lenses 16a, 16b, and 23, the two pathways I and II have the same number of (spherical) "transmission thicknesses." The optical material used for the plane-parallel plate 20, the beam splitters 4, 13, and the lenses 23, 17a, and 17b (for example glass) should possess nearly identical optical properties for the (laser) radiation used. This will prevent a dispersion of the group velocities.

The detector field is comprised, for example, of 1024× 1024 CCD elements, which are positioned at a distance of approximately 6.8 $\mu$m from one another. These detectors are connected to an evaluation unit 29, which automatically switches on the detectors three times within one period of the 100 Hz beat frequency, reads out the measured values, and places these values, per detector, in first memory units 30, with a corresponding number of detectors and scanning cycles in at least 300'000 individual memory units.

Because now three measured values can be evaluated per beat frequency period and detector (locus), the complex amplitude (intensity and phase angle) at each of the detectors can be determined by a first calculating unit. The complex amplitude is a superimposition of the radiation reflected off of the object being measured (beam 25) and the unaffected radiation (beam 14a). The structural information about the object 1 is contained in the complex amplitude that is calculated.

The phase angle values now calculated for each detector are stored in second memory units 33 (also with at least 300'000 individual memory units) along with the corresponding amplitude values (intensity values), which require at least another 300'000 individual memory units. The phase angle values stored in the second memory units 33 are multiplied, via a multiplier unit 35, by a value that determines the magnification of the structure of the locus 24, and are stored in the third memory units 36. With the magnified phase angle values now stored in the third memory units 36, and the associated intensity values from the second memory units 33, using the mathematical algorithm, stored in a second multiplier unit 37, for a two-dimensional Fourier transformation, such as is described in the publication by Ulf Schnars, et al. "Digital Holography—a New Method of Laser Measuring Technology", Laser und Optoelektronik [Lasers and Optoelectronics], 26(5), 1994, pp. 40–45; and in U. Schnars, "Direct Phase Determination in Hologram Interferometry with Use of Digital Recorded Holograms", J. Opt. Soc. Am. A, 11, (7), 2011–2015, July 1994, an image is calculated point by point, which can be displayed via an output unit 39. The output unit 39 may be a screen or a plotter, for example. The image generated here represents a magnification of the structure found at the locus 24. In contrast with traditional light-optical microscopic images, this image is no longer limited by diffraction. It can illustrate spatial structures.

Below, some mathematical approaches are given to clarify the above submicroscopic magnification process. To make it clearer, two plane wave fronts A and R, which are superimposed at a single point at the distance z, are used. They can be plotted using the following equations (1) and (2):

$$A = A_0 \cdot \cos(wt - kz + \Phi_d) \quad (1)$$

$$R = R_0 \cdot \cos[(w + \Omega)t - kz] \quad (2)$$

$A_0$ and $R_0$ represent the given amplitude values for the radiation; w represents the lower annular frequency of the radiation $f_a$ (w=$2\pi f_a$); (w+$\Omega$) represents the higher annular frequency of the radiation $f_b$, wherein $\Omega$ represents the beat frequency. K is the wave vector.

The phase angle $\Phi$ of a wave at a distance d from a reference point thus becomes shifted in relation to the phase angle at this point by $$\Phi_d = k \cdot d. \quad (3)$$

A now represents the wave that proceeds from a point on the structure at the distance d from a reference point, and R represents the reference wave. For a superimposition at the point of the detector field 19, not accounting for the lens 23, the following now applies for the intensity I measured by the detectors:

$$I=(A+R)^2$$

$$I=(A_0 \cdot \cos(wt-kz+\Phi_d)+R_0 \cdot \cos[(w+\Omega)t-kz])^2$$

The detectors now cannot follow the optical frequency $f_a$ or $f_b$, and thus form the average value <I>, from the intensity that is received on them:

$$<I>=\tfrac{1}{2}A_0^2+\tfrac{1}{2}R_0^2+2A_0R_0<\cos[wt-kz+\Phi_d]\cdot\cos[(w+\Omega)t-kz]>$$

$$<I>=\tfrac{1}{2}A_0^2+\tfrac{1}{2}R_0^2+A_0R_0\cdot\cos[\Omega t-\Phi_d] \quad (4)$$

Thus a beat signal $A_0 R_0 \cdot \cos[\Omega t - \Phi_d]$ is obtained, from which phase angle values having a precision of $10^{-3}$ can be determined by experiment. In other words, an interval d can be determined in accordance with the equation (3) $d=10^{-3}/k$, using a laser wavelength of 500 nm, with $$d = \frac{10^{-3}}{2\pi} \cdot 500 \text{ [nm]} = 8 \cdot 10^{-2} \text{ [nm]}.$$

As described above, the phase angle is now determined in that the values of the detectors are read out at equal temporal intervals, three times per beat frequency $\Omega$.

If the two waves A and R are plane waves that are inclined toward one another by an angle $\delta$, then the following results at a distance s from a reference axis 41 that passes through the reference position, similar to the above performance for the wave:

$$A=A_0 \cdot \cos[wt-k\cdot\delta\cdot s+\Phi_d]. \quad (5)$$

The reference wave R does not change.

$$I=(A+R)^2$$

$$I=(A_0 \cdot \cos(wt-k\cdot\delta\cdot s+\Phi_d)+R_0 \cdot \cos[(w+\Omega)t-kz])^2$$

The following results from the averaging process from the detectors:

$$<I>=\tfrac{1}{2}A_0^2+\tfrac{1}{2}R_0^2+A_0R_0<\cos[(2w+\Omega)t-k\cdot\delta\cdot s+\Phi_d]\cdot\cos[\Omega t+k\cdot\delta\cdot s-\Phi_d]>$$

$$<I>=\tfrac{1}{2}A_0^2+\tfrac{1}{2}R_0^2+A_0R_0\cdot\cos[\Omega t+k\cdot\delta\cdot s-\Phi_d] \quad (6)$$

The change in the phase angle $\Phi_{tr}$ at a position that is at the distance s from the reference axis 41 (in the detector plane 19), thus yields $$\Phi_{tr}=k\cdot\delta\cdot s-\Phi_d. \quad (7)$$

If $\Phi_d = 0$ is inserted, then for the angle-dependent phase shift only this follows:

$$\delta = \frac{\Phi_{tr}}{k \cdot s} \quad (7a)$$

Thus, the above assumptions, with a laser wavelength of 500 nm and a distance of 1 mm, which corresponds approximately to the boundary detectors of the 1024×1024 CCD detector field, yield a resolution of $$\delta = \frac{10^{-3}}{2\pi} \cdot \frac{500 \text{ [nm]}}{1 \text{ [mm]}} = 8 \cdot 10^{-8} \quad (8)$$

Figure 3:
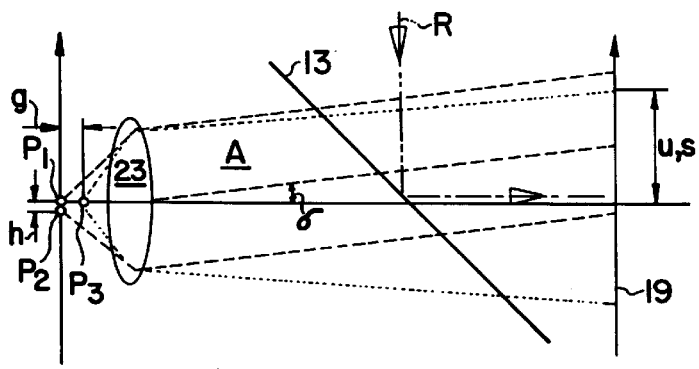
FIG. 3 is an illustration of the calculation of phase relationships of plane and spherical waves, based upon points in the environment of the focusing point of a lens.

In order now to convert this angular resolution into a spatial resolution, the spherical lens 23 having a focal length f is used, for example. Waves originating from the points $P_1$ and $P_2$ of the object 1, as illustrated in FIG. 3, are thus transformed into plane waves. The wave proceeding from the point $P_1$ and having the coordinates x=0, y=0 and z=0 can be described, analogous to the above equation (1), with $$A=A_0 \cdot \cos(wt-kz) \quad (9)$$

The wave proceeding from the point $P_2$ and having the coordinates x=$-h$, y=0, and z=0 can be described. analogous to the above equation (5), with $$A=A_0 \cdot \cos(wt-k\cdot\delta\cdot h) \quad (10)$$

The wave proceeding from the point $P_3$ and having the coordinates x=0, y=0, and z=g, since $P_3$ is no longer in the focus of the lens 23, is now no longer a plane wave, but is a spherical wave at a distance $z_v$ from a virtual center. This distance $z_v$ can be determined using the lens equation, wherein $f_{23}$ is the focal length of the lens 23:

$$\frac{1}{z_v + f_{23}} = \frac{1}{f_{23}} - \frac{1}{f_{23}-g} \approx \frac{1}{f_{23}} - \frac{1+g/f_{23}}{f_{23}} = \frac{-g}{f_{23}^2} \quad (11)$$

or $$z_v = \frac{-f_{23}^2}{g} - f_{23} \approx \frac{-f_{23}^2}{g} \quad (12)$$

For g–0, in other words $P_3$ slides into the focal plane, $z_v$ opposes $\infty$ and a plane wave is again obtained. For a locus O in the detector plane 19 at distance d, a phase shift is yielded:

$$\Phi_g = k \cdot \left(\sqrt{z_v^2 + u^2} - z_v\right) \quad (13)$$

Assuming that u<<$z_v$, the following is true:

$$\Phi_g = k \cdot \left(\sqrt{z_v^2 + u^2} - z_v\right) = k \cdot \left(z_v\sqrt{1+(u/z_v)^2} - z_v\right)$$

$$= k \cdot (z_v(1+1/2(u/z_v)^2) - z_v) = \frac{k \cdot z_v}{2} \cdot (u/z_v)^2 = \frac{k \cdot u^2}{2z_v}$$

If equation (12) is inserted into this equation, then for the phase shift $\Phi_q$ with the wavelength $l_w$ of the radiation $$\Phi_g = \frac{k \cdot u^2}{2z_v} = \frac{-k \cdot u^2 \cdot g}{2 - f_{23}^2} = \frac{-\pi \cdot u^2 \cdot g}{l_w \cdot f_{23}^2} \quad (14)$$

If the example values for u=1 mm used above, which corresponds approximately to the boundary detectors of the 1024×1024 CCD detector field, a wavelength 1 of 500 nm, and a focal length for the lens 23 of f=2 mm are inserted, then the following is true for the phase shift:

$$|\Phi_g| = \frac{\pi}{4} \cdot \frac{g}{l_w}$$

Because phase shifts with a magnitude of $10^{-3}$ can now be determined using measurement techniques, a resolution of $$g = \frac{4 \cdot l_w}{\pi} \cdot \Phi_g = 0.64 \text{ nm}$$

is obtained.

A plane wave proceeds, after the focusing lens 23, at the angle δ from point $P_2$, which is displaced transversally in relation to point $P_1$, and has the coordinates x=−h, y=0, and z=0. The following thus applies:

$$\delta = \frac{h}{f_{23}}$$

With equation (7a), it then follows that $$h = \frac{\Phi_{tr}}{k \cdot s} \cdot f = \frac{l_w \cdot \Phi_{tf} \cdot f_{23}}{2\pi \cdot s}$$

If the sample values already used above of 1=500 nm, $\Phi_{tr}=10^{-3}$, $f_{23}=2$ mm, and s (or u)=1 mm, are inserted into this equation, the result is a transversal resolution of 0.16 nm. This resolution is greater than the elevated resolution g. This product is derived from the calculation only by approximation.

Figure 4:
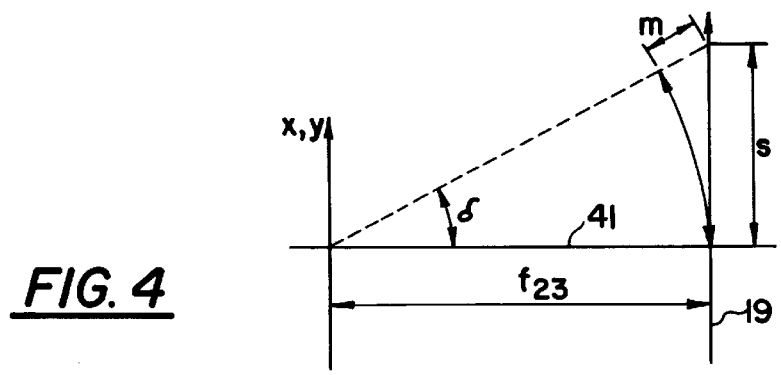
FIG. 4 is an illustration of the computation of errors in calculating transversal resolution.

In accordance with FIG. 4, the following estimate can be employed with a focal length of 2 mm and a distance of 1 mm between a (boundary) detector and the reference axis:

$$m = \sqrt{f_{23}^2 + s^2} - f_{23} = \sqrt{2^2 + 1^2} - 2 = 0.23$$

This distance m can now be compared with the maximum distance $f_{23}=2$ mm:

$$\frac{m}{f_{23}} = \frac{0.23}{2} \approx 0.1$$

The above theoretical resolution is diminished by this value 0.1.

From these performances it can be seen that resolutions can be produced using the method and the device specified in the invention that are considerably better than those produced using the optical microscope, which is limited by the effects of optical diffraction.

Based upon the optical condition of the object 1, the above-described inventive measuring method or the measuring device specified in the invention can now be used to measure the surface structure or to determine the inner spatial radiation that has penetrated the object 1.

In contrast to holographic measuring methods, the measuring method specified in the invention is no longer assigned to detectable or recordable interferences between the measuring beam and the reference beam. Using the calculated elevation of the phase values "the measuring process creates the interferences necessary for the desired resolution itself."

Rather than generating the frequency shift of the two partial beams 5a and 5b toward one another through one or two acoustic-optical modulators 7a and 7b, the positions of the two mirrors 17a and 17b may be periodically changed. In addition, rotating gratings and electricoptical modulators may be used, with the phase shift being dependent upon the applied voltage.

The beat frequency $|f_a-f_b|$ should be selected to be as great as possible, so that thermal or other path length changes between the two partial beams 5a–11a, 14a and 5b–11b-21–25 produce no measured value distortions. This is, however, limited by the reading speed and storage speed of the measured values from the detectors, as well as their sensitivity.

Use of the two-dimensional Fourier transformation can be omitted. In that case, rather than a directly viewable image, a holographic image is generated, which then can be viewed with the corresponding coherent radiation.

The following is claimed:

1. A method for defining a three-dimensional structure of an object having a submicrometer size, the method comprising the steps of:

splitting a coherent electromagnetic radiation beam into two partial beams, including a first partial beam and a second partial beam;

focusing the first partial beam on an object having a focal diameter being approximately one wavelength of the coherent electromagnetic radiation beam;

reflecting the first partial beam from the object to yield a first radiation traversing through a focusing lens and directing a second partial beam to form a second radiation so as to superimpose the first and second radiation at a locus or loci on a detector field including several interdependent detectors;

converting locus-dependent radiation intensity values detected for at least three different beam positions of at least one of the two partial beams on the detectors into electrical signals;

determining complex amplitude values with associated initial phase values from the electrical signals for a local wave field at the locus or loci of the detectors; and establishing second phase values from the initial phase values via multiplication of the initial phase values by a predetermined value; and generating a holographic image of a magnified object structure representative of the object by using the second phase values, the complex amplitude values and position coordinates of the detectors.

2. The method in accordance with claim 1 further comprising the step of generating image data for a directly viewable image from holographic image information of the magnified object structure by using a two-dimensional Fourier transformation and a predetermined computation formula.

3. The method in accordance with claim 1 further comprising the step of detecting time-dependent radiation intensity values to form corresponding ones of the complex amplitude values for the different beam positions for generating the holographic image.

4. The method in accordance with claim 3 further comprising establishing the different beam positions, by shifting a first radiation frequency (fb) of the first partial beam in relation to a second radiation frequency (fa) of the second partial beam by a frequency differential susceptible to processing via electronic components.

5. The method in accordance with claim 4 further comprising modulating both partial beams (5a, 5b) by a first and a second intensity modulation at the first radiation frequency and the second radiation frequency, respectively.

6. A method in accordance with claim 4, further comprising the step of producing a period of a beat frequency as an inverse of the frequency differential, and storing radiation intensity values measured by the detectors in the detector field at least three times per beat period.

7. The method in accordance with claim 1, further comprising the step of generating the different beam positions in relation to one another via optical path length changes of the two partial beams relative to one another.

8. A device for defining three-dimensional structures of an object having a size in the submicrometer range, the device comprising:

a beam splitter for splitting a coherent beam, into two partial beams including a first partial beam and a second partial beam;

a focusing lens for focusing the first partial beam on a focusing diameter being in the wavelength range of the coherent beam, on or in the object;

a detector field containing several interdependent detectors for detecting a superimposition of the second partial beam upon redirection and the first partial beam upon reflection from the object;

an evaluating unit connected to the detectors, having several first memory units for electrical values received from each of the detectors;

a first calculating unit connected to the first memory units for determining complex amplitudes using the electrical values stored in the first memory units;

a plurality of second memory units connected to the first calculating unit for storing the complex amplitude values;

a multiplier unit connected to the second memory units for the mathematical multiplication of initial phase values to obtain second phase values for the complex amplitude values, using a factor determined by a desired magnification of the object structure of the object;

a plurality of third memory units connected to the multiplier unit for storing the second phase values obtained via the multiplication;

a second multiplier unit connected to the second and third memory units for determining the magnified object structure from the second phase values and the intensity values stored in the second memory units via a mathematical algorithm in the second multiplier unit;

a display unit, connected to the second multiplier unit, for displaying the magnified object image or holographic image determined from the second calculating unit.

9. The device in accordance with claim 8 further comprising a frequency shift element for shifting a first beam frequency of the first partial beam relative to a second beam frequency of the second partial beam.

10. The device in accordance with claim 9, characterized in that the frequency shift element is adapted to modulate the intensity and/or phase of at least one of the partial beams with a predetermined frequency; and further comprising one acoustic-optical modulator being associated with each partial beam, the modulation frequencies of the partial beams differing by a differential frequency of a few hundred hertz; acoustic-optical modulator containing a timing generator for activating the detectors at least three times per differential frequency cycle, and storing measured values in the first memory units.

11. The device in accordance with claim 9, further comprising a second beam splitter/concentrator and a beam deflector, wherein the first partial beam is focused in the focusing lens on the object to be measured and is reflected from the focal point through the focusing lens, and through the beam splitter, onto the detectors of the detector field; the second partial beam being reflected through the second beam splitter via the beam deflector and again to the second beam splitter to a locus of the penetration of the first beam, and being radiated, combined with the first beam, onto the detectors of the detector field.

12. The method according to claim 1 wherein the splitting step comprises splitting a laser beam as the coherent electromagnetic radiation beam.

13. The method according to claim 6 further comprising the step of establishing beat frequency of a few hundred hertz.

14. A method for defining a three-dimensional structure of an object having a submicrometer size, the method comprising the steps of:

splitting a coherent electromagnetic radiation beam into two partial beams including a first partial beam and a second partial beam;

reflecting the first partial beam from the object to yield a first radiation traversing through a focusing lens toward a locus region being monitored by detectors;

directing a second partial beam to form a second radiation so as to create an electromagnetic combination of the first and second radiation at the locus;

detecting electromagnetic parameters of an electromagnetic field of the electromagnetic combination associated with the locus to convert the electromagnetic parameters into electrical signals;

establishing second phase values from initial phase values of the electromagnetic field, as represented by the electrical signals, via multiplication of the initial phase values by at least one predetermined value; and generating a magnified image representative of the object by using the second phase values, the electromagnetic parameters, and coordinates of the detectors relative to the locus.

15. The method according to claim 14 wherein the generating step comprises generating a holographic image as the magnified image.

16. The method according to claim 14 wherein the generating step comprises generating a displayable image as the magnified image suitable for displaying to a user on a display.

17. The method according to claim 14 further comprising the step of:

focusing the first partial beam on an object having a focal diameter being approximately one wavelength of the coherent electromagnetic radiation beam.

18. The method according to claim 14 further comprising the step of:

determining complex amplitude values with associated corresponding initial phase values as the electromagnetic parameters of the electromagnetic field at the locus or loci of the detectors.

19. An apparatus for defining a three-dimensional structure of an object having a submicrometer size, the apparatus comprising:

a splitter for splitting a coherent electromagnetic radiation beam into two partial beams including a first partial beam and a second partial beam;

a focusing lens for focusing the first partial beam on the object and for passing a first radiation reflected from the object toward a locus region;

a beam-directing system for directing a second partial beam to form a second radiation so as to create an electromagnetic combination of the first and second radiation at the locus region;

detectors for monitoring the locus region and for providing electrical signals responsive to electromagnetic parameters of the electromagnetic combination associated with the locus region;

a calculator for calculating second phase values from initial phase values of the electromagnetic combination, as represented by the electrical signals, via multiplication of the initial phase values by at least one predetermined value; and an image generator for generating a magnified image representative of the object by using the second phase values, the electromagnetic parameters, and coordinates of the detectors relative to the locus region.

20. The apparatus according to claim 19 wherein the magnified image comprises a holographic image.

21. The apparatus according to claim 19 further comprising a display coupled to the image generator, the display being suitable for displaying the magnified image.

22. The apparatus according to claim 19 further comprising an electromagnetic energy source for providing the coherent electromagnetic radiation beam having a wavelength being approximately equal to a focal diameter of the object, the electromagnetic energy source electromagnetically coupled to the splitter.

23. The apparatus according to claim 19 wherein the calculator is adapted to determine complex amplitude values with associated corresponding initial phase values as the electromagnetic parameters of the electromagnetic field at the locus of the detectors.

* * * * *